J. C. MELOON.
Stop-Cock.
No. 161,698. Patented April 6, 1875.
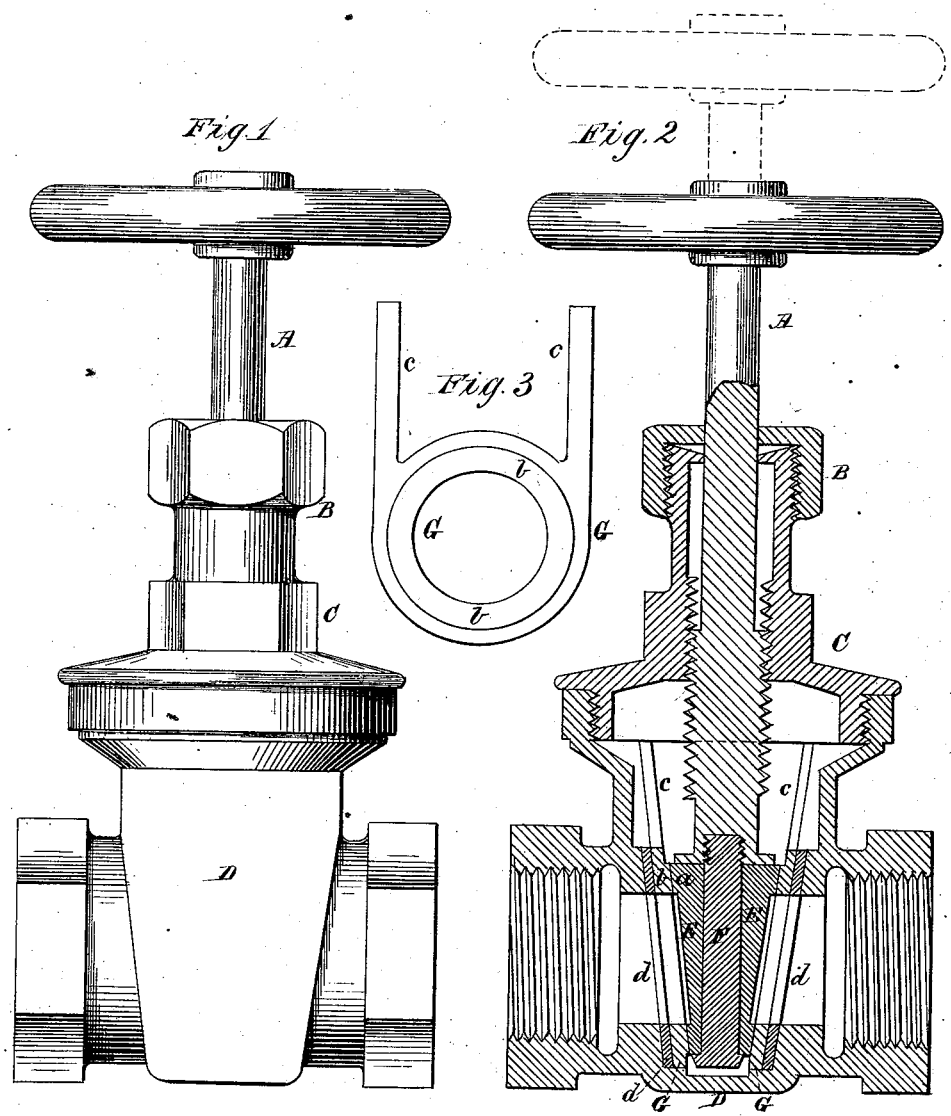

UNITED STATES PATENT OFFICE.

JONATHAN C. MELOON, OF PROVIDENCE, RHODE ISLAND.

IMPROVEMENT IN STOP-COCKS.

Specification forming part of Letters Patent No. 161,698, dated April 6, 1875; application filed February 12, 1875.

*To all whom it may concern:*

Be it known that I, JONATHAN C. MELOON, of the city and county of Providence, in the State of Rhode Island, have invented a new and Improved Valve, of which the following is a specification:

In the accompanying drawings like letters indicate like parts.

Figure 1 is a side elevation of my invention. Fig. 2 is a longitudinal section of the same. Fig. 3 shows the movable disks, which characterize my invention.

My invention consists of a direct valve, with a sliding seat, and provided with movable disks or cheek-pieces, to form the working-surfaces, which are previously ground in contact with the seat, for the purpose of securing a perfect joint between the parts. When the valve is worn and becomes leaky and inefficient, these disks may be taken out and ground anew, in a lathe or otherwise, with the seat, until they again exactly correspond and fit together, after which they can be replaced; or when these parts are entirely worn out, new ones may be substituted, and all this repairing and duplicating can be done without disconnecting the valve from the pipes. In the valves commonly used, the working-surfaces cannot be properly refitted to each other, when once worn, and cannot be reached at all for that purpose, except by wholly removing the valve from its connections, while the grinding of these surfaces must be done through the ports, within the body of the valve itself, where neither sufficient power nor motion can be obtained to accomplish the result properly. These valves therefore are not durable and must soon be replaced by entirely new ones; but with mine, it is only the working-surfaces which become useless by wear, and which can be readily duplicated, while the body and other parts of the valve are as useful and valuable as ever.

Various devices have been employed to secure the proper contact of the seat with the adjacent parts of the valve. It is common to make the seat in two pieces, which are spread apart by interposed wedges, cams, or other contrivances for the purpose of making a tight joint. I use a solid seat with wedge-faces, ground with the corresponding faces of the adjacent disks till their surfaces are exactly fitted to each other. This process of grinding is repeated whenever the surfaces have been cut up or become otherwise unequal, these parts being taken out of the body of the valve for that purpose.

In the drawing, A represents the spindle; B, the stuffing-box; C, the stand; and D, the body of the valve. The seat E is circular in shape, with faces inclined to each other like a wedge, upon each of which is a circular shoulder, $a$, at the outer edge, forming its working-surface. It fits loosely upon its spindle—the tap-bolt F—and has a direct motion by its guides along the grooves cut for it within the body of the valve. The movable metallic disks G G are inserted in other grooves within the body, which lie parallel to the faces of the seat. A circular shoulder, $b$, is cast upon the inner or wearing-surface of the disk. Horns $c\ c$ project from both sides of it, which rest solidly against the inside of the stand C, and serve to keep the disks in place immovably. Rings of rubber or other suitable packing form cushions $d\ d$, lying between the disks and the body of the valve.

As the spindle slides the seat of the valve into place, the wedge-like faces crowd snugly against the disks, cushioned as described, and as these surfaces are identically alike, a perfectly tight joint is secured.

It is the distinguishing characteristic of my invention that these disks are separate pieces, and are adjustable, admitting of convenient removal, thorough repair, and of duplication when worn out; and this, without disturbing the connections of the valve with the pipes, or doing injury to the body in any manner; while in all other valves the worn parts cannot be removed or replaced, but the entire valve becomes useless. It is obviously within my invention, if one or more movable disks, or their equivalents, of whatever other material, shape or relative location, are placed within a valve for the purposes described. It is also apparent that the disks, instead of being held in place by prongs bearing against the screw-cap, as above-described, may be secured by pins, studs, or other contrivances.

I therefore claim, as a novel and useful invention, and desire to secure by Letters Patent—

1. The combination of sliding adjustable disks G, each provided with horns $c$, with the stop-valve E and screw-cap C, substantially as and for the purpose set forth.

2. The improved valve herein described, consisting of the spindle A F, stuffing-box B, stand C, body D, properly grooved to receive the wedge-shaped seat E, the movable disks G G, and packing $d\ d$, all made substantially as shown, and for the purpose specified.

JONATHAN C. MELOON.

Witnesses:
 EDWIN MACARTNEY,
 WARREN R. PERCE.